Figure 1:
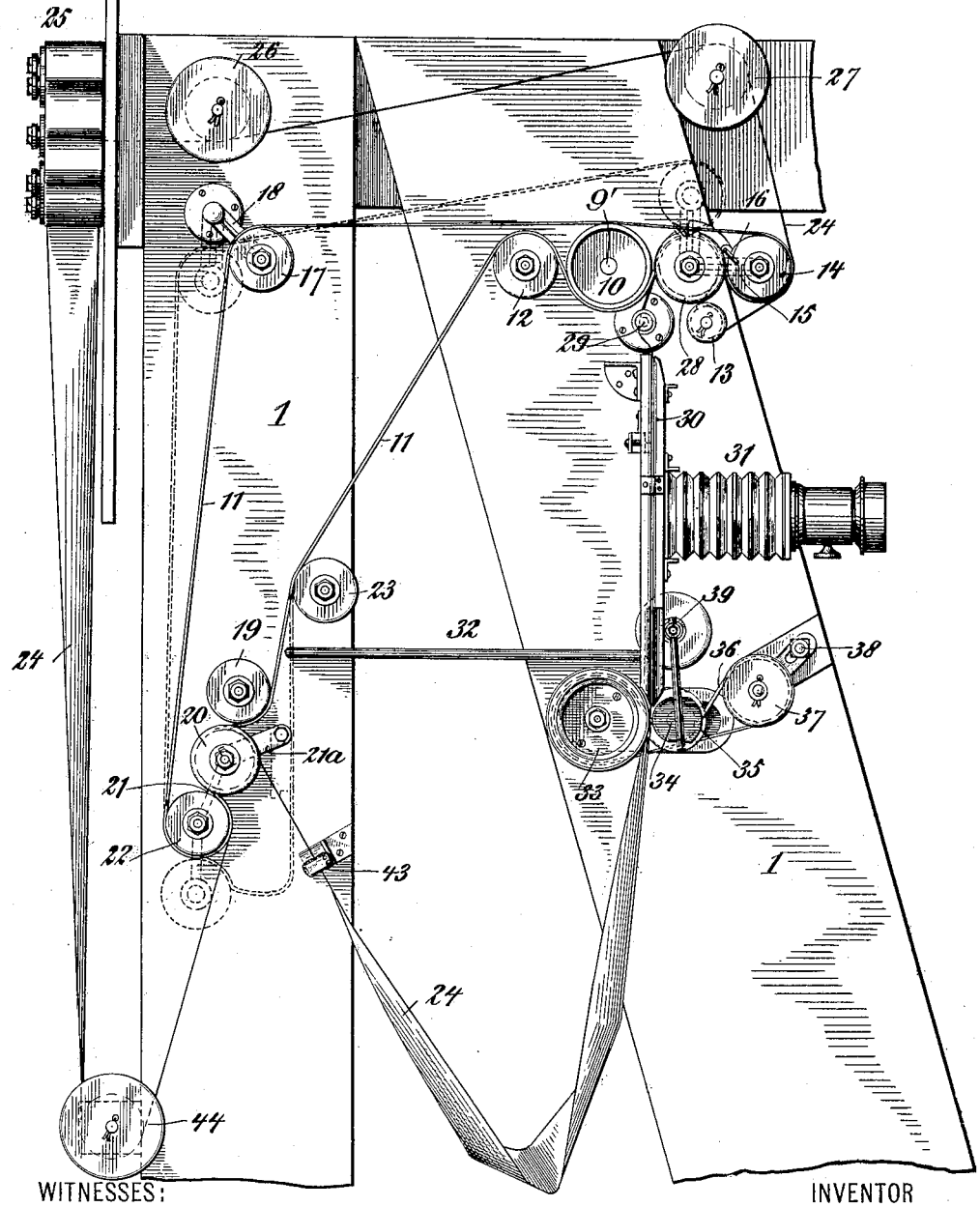

No. 611,590. Patented Sept. 27, 1898.
H. CASLER.
WEB FEEDING MECHANISM.
(Application filed Dec. 10, 1896.)

(No Model.) 4 Sheets—Sheet 1.

WITNESSES:
INVENTOR
Herman Casler
BY
his ATTORNEY

THE NORRIS PETERS CO., PHOTO-LITHO., WASHINGTON, D. C.

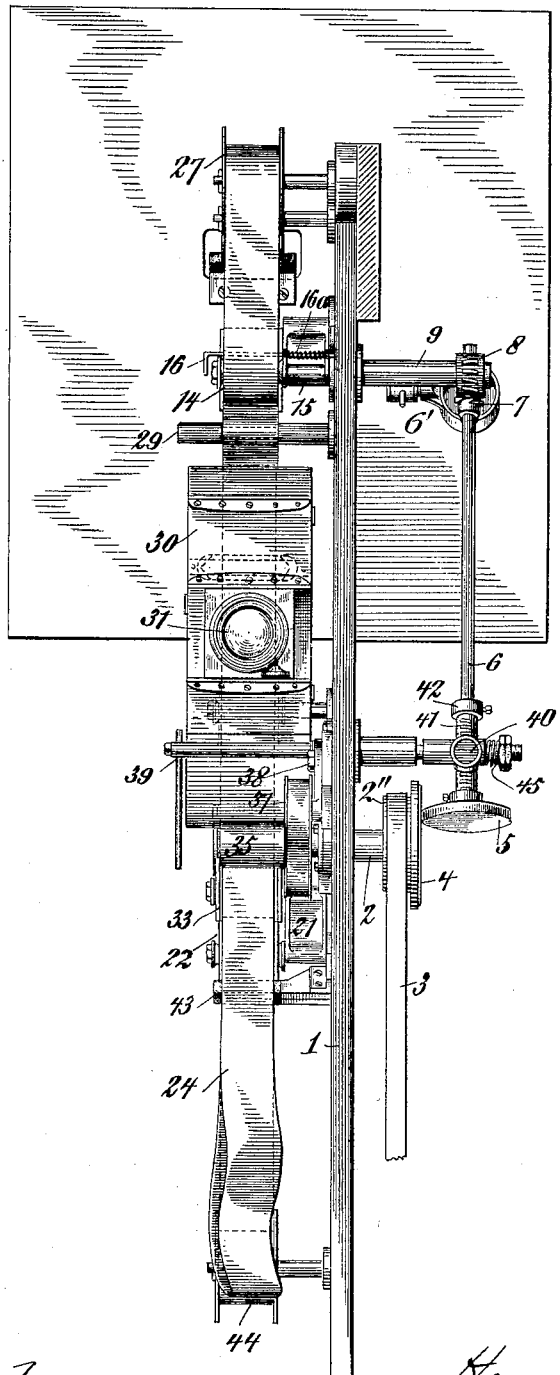

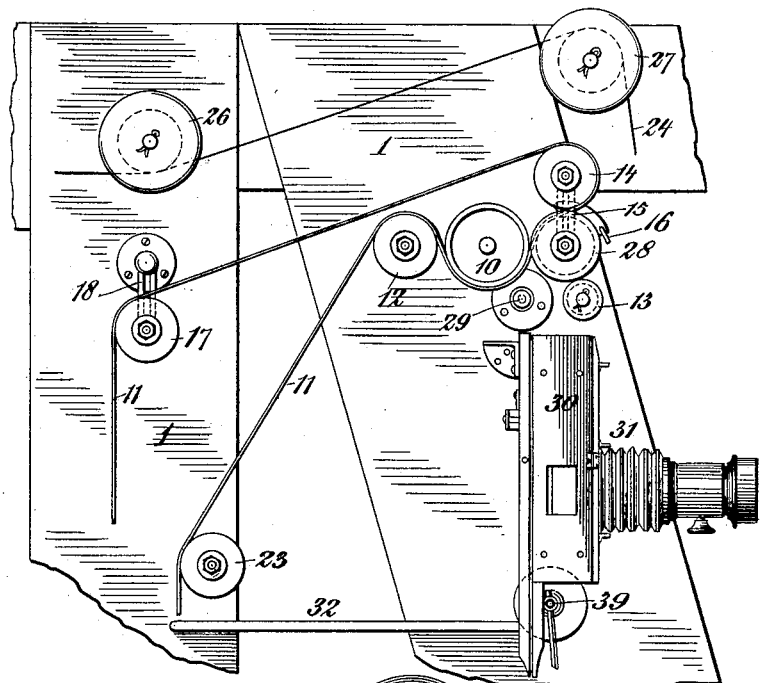
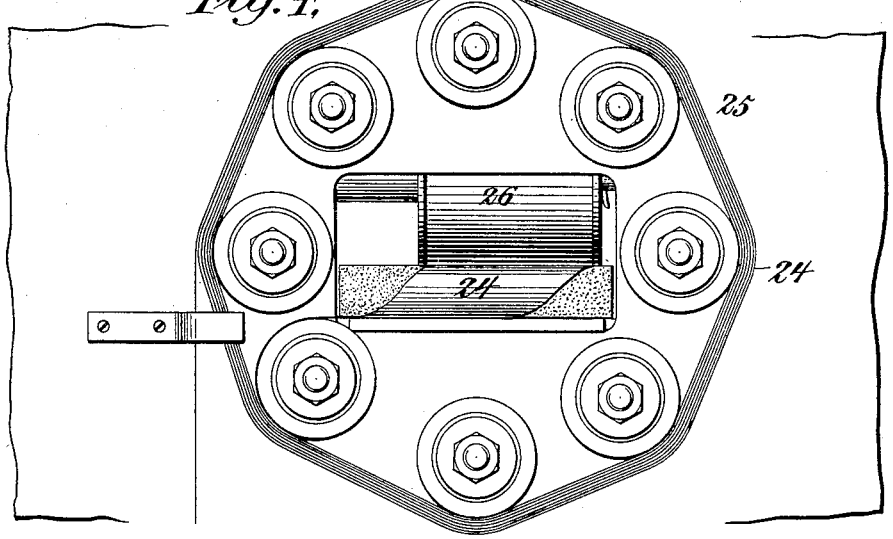

No. 611,590. Patented Sept. 27, 1898.
H. CASLER.
WEB FEEDING MECHANISM.
(Application filed Dec. 10, 1896.)
(No Model.) 4 Sheets—Sheet 4.
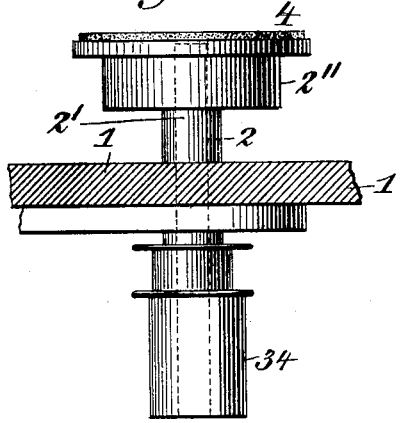
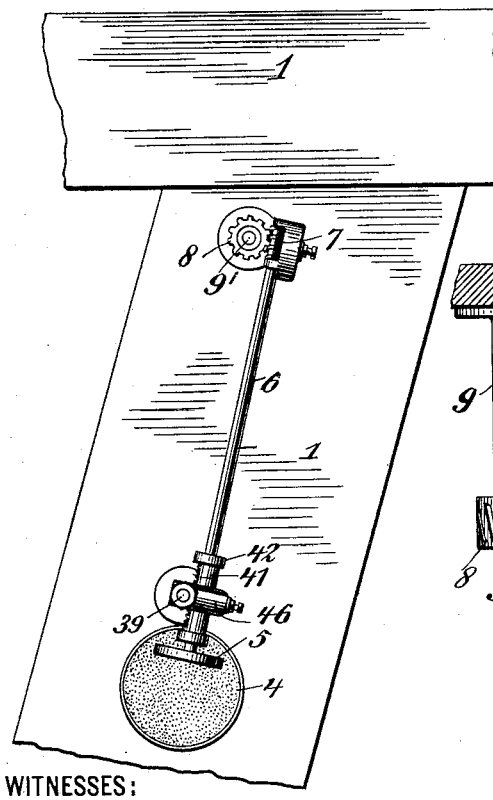
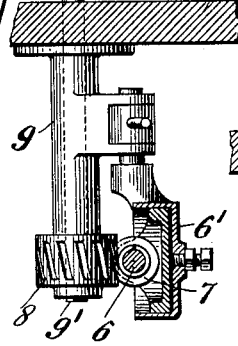
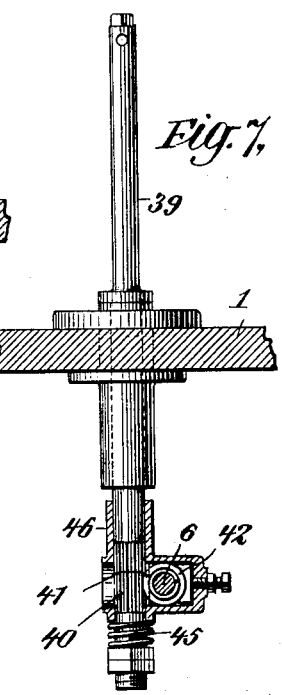
WITNESSES:
INVENTOR
Herman Casler
BY
E. M. Marble & Sons
ATTORNEYS

UNITED STATES PATENT OFFICE.

HERMAN CASLER, OF CANASTOTA, NEW YORK, ASSIGNOR TO THE AMERICAN MUTOSCOPE COMPANY, OF NEW YORK, N. Y.

WEB-FEEDING MECHANISM.

SPECIFICATION forming part of Letters Patent No. 611,590, dated September 27, 1898.

Application filed December 10, 1896. Serial No. 615,189. (No model.)

*To all whom it may concern:*

Be it known that I, HERMAN CASLER, a citizen of the United States, residing at Canastota, in the county of Madison and State of New York, have invented certain new and useful Improvements in Web-Feeding Mechanism, (Case No. 7;) and I do hereby declare the following to be a full, clear, and exact description of the invention, such as will enable others skilled in the art to which it appertains to make and use the same.

My invention relates generally to web-feeding mechanism, and more particularly to the web-feeding mechanisms employed for feeding the picture-strips of consecutive-view apparatus, such as the projecting machines which reproduce to the eye the motions of a moving object or group of objects. In the class of machines referred to a series of pictures, usually photographs, of a moving object or group of objects are imprinted on a long strip of photographic film, and this strip is drawn intermittently past a powerful light and before a set of lenses which project an enlarged reproduction of each picture on a screen in a darkened room. The pictures follow one another with such rapidity that the eye cannot distinguish between them and the observer gets the impression of motion on the part of the objects depicted. In a machine of this nature it is evident that the band or web of photographic film must be given a series of nicely-graduated and intensely-rapid motions with as little injury to the film as possible and that a long length of such web or band must be handled. It is necessary that the film shall be moved intermittently through the field of the apparatus and not continuously in order that clear pictures may be obtained, and the very great rapidity with which the intermittent movement must take place and the necessity of avoiding all jar and vibration, both of the mechanism itself and of that portion of the film which is in the field of the apparatus, and the necessity of avoiding jerking the film severely, which might tear it, makes it desirable to use main feeding and take-up mechanisms, which operate continuously, and to employ an auxiliary feeding mechanism for feeding the film through the field of the apparatus, and for the same reason it is desirable that this auxiliary feeding mechanism shall be in continuous movement at all times.

My invention consists in the novel main feeding, take-up, and auxiliary feeding mechanisms employed, in the novel means employed for causing the main feeding and the take-up mechanisms to act uniformly upon the film or strip, in the novel means employed for compensating for slipping or shrinkage of the film, and in the novel combination, construction, and arrangement of the various parts of the web-feeding mechanism.

The objects of my invention are, first, to provide improved web-feeding apparatus for feeding webs or strips intermittently and at a high rate of speed which shall operate without jar or vibration and shall cause no injury to the web or strip; second, to provide improved means for causing the main feeding and the take-up mechanisms to feed forward and take up the strip or web at the same speed, so as to avoid either the accumulation of loose film in the machine or drawing the film too tight; third, to provide an improved intermittently-acting auxiliary feeding mechanism; fourth, to provide improved means for compensating for slipping or shrinkage of the film or strip and for varying the length of film fed forward each time the auxiliary feed mechanism acts, and, fifth, to make the whole apparatus simple, compact, not liable to derangement, and comparatively inexpensive. These objects are attained in the web-feeding mechanism herein described, and illustrated in the drawings which accompany and form a part of this specification, in which the same reference-numerals indicate the same or corresponding parts, and in which—

Figure 1 is a side elevation of the complete mechanism of the projecting-machine, the illuminating apparatus being omitted. Fig. 2 is an end elevation of the mechanism, looking from the right-hand side of Fig. 1. Fig. 3 is a side elevation of the upper portion of the feeding mechanism, showing the main feeding mechanism open for the threading of the film. Fig. 4 is an elevation of the film-reel, the side view of which is shown in Fig.

1. Fig. 5 is a detail plan view of the gripping-pulley 34 of the auxiliary feeding mechanism, the boss 2, in which the main driving-shaft 2' is mounted, and the belt-pulley and friction-disk 4 on said shaft. Fig. 6 is a detail elevation of the speed-changing gear through which the main feeding mechanism is driven, the view being taken from the side opposite to that from which Figs. 1 and 3 are taken. Fig. 7 is a detail plan view of the regulating-shaft 39 and the parts connected therewith, the sleeve 46, which surrounds this shaft, being shown in section; and Fig. 8 is a plan view of the gearing at the upper end of the shaft 6 of the speed-changing gear, a portion of the universal-joint bracket which supports the upper end of the shaft 6 being shown in section.

In the drawings, 1 is the main frame of the apparatus, and may be of any suitable material.

2 (shown in Figs. 2 and 5) is a boss projecting from the frame 1, in which a shaft 2' (shown in dotted lines in Fig. 5 and which is the main driving-shaft of the machine) has its bearing. The shaft 2' is provided with a belt-pulley 2'', over which passes a driving-belt 3, and carries also a friction-disk 4, which is one element of the speed-changing gear by which the main feeding mechanism is driven, the other element being the friction-wheel 5, mounted upon a shaft 6. The shaft 6 has a bearing at its lower end in a sleeve 42, itself supported by a sleeve 46 upon the rock-shaft 39, as shown in the detail view Fig. 7. The rock-shaft 39 has a bearing in a boss projecting from the frame 1. At its upper end the shaft 6 has a bearing in a universal-joint bracket 6', supported by the boss 9. Upon the upper end of the shaft 6 is a worm 7, connected to the shaft 6 by a spline, so that the shaft may move up and down freely, and meshing with a worm-wheel 8, mounted on a shaft 9', which has a bearing in the boss 9 and passes through to the other side of the machine and there carries a pulley 10, (see Figs. 1 and 3,) which is the driving-pulley of the main feeding and take-up mechanisms and belt 11.

The sleeve 42 is arranged to permit rotation of the shaft 6, but to prevent endwise movement of said shaft relative to the sleeve. The sleeve is provided with rack-teeth 41, as shown in Figs. 2 and 6, and is arranged to move endwise in the sleeve 46, by which it is supported from the rock-shaft 39. The rock-shaft 39 has a pinion 40, which engages these rack-teeth 41, and is provided with a handle or crank (shown in Figs. 1, 2, and 3) by which it may be rotated. The sleeve 46 is capable of movement along the shaft 39, and a spring 45 tends to press the sleeve inward, in so doing pressing the friction-wheel 5 against the friction-disk 4.

Referring now to Fig. 1 and considering particularly the web-feeding devices there shown, 10, as already stated, is the driving-pulley. A belt 11 passes under and around this pulley and also around other pulleys 12, 23, 19, 20, 22, 17, 14, and 28. The pulleys 14, 28, and 10, with the portion of the belt 11 which is upon them at any instant, constitute the main feeding mechanism, and pulleys 19, 20, and 22, with the portion of the belt 11, which is upon them at any instant, constitute the take-up mechanism. Pulley 14 is mounted upon a swinging hanger 15, which permits it to be moved up into the position shown in Fig. 3 and in dotted lines in Fig. 1 out of the path of the film, in which position of the pulley the belt 11 is slack. A latch 16 is provided for holding the pulley 14 in either of its positions, the latch being controlled by a spring 16$^a$. (Shown in Fig. 2.) The pulley 20 of the take-up mechanism is also mounted on a swinging hanger 21, and a pivoted latch 21$^a$, which normally engages this hanger, may be dropped into the position shown in dotted lines in Fig. 1, thus permitting the pulley to drop into the position shown in Fig. 1 in dotted lines, out of the path of the film, so slacking the belt. The pulley 17 is a belt-tightener. It is mounted on a swinging hanger 18, and its weight and that of the hanger keeps the belt tight when the pulleys 14 and 20 are in the positions shown in full lines in the drawings.

24 is the web or strip of photographic film carrying the views. It is drawn from a suitable reel 25 and after passing through the field of the projecting apparatus is wound up again upon a reel. In the drawings the film-guiding rolls are shown arranged to draw the film from and return it to a single reel 25, which is of peculiar construction, being adapted to have film drawn from it and wound about it simultaneously. The general construction of this reel is shown in Fig. 4. It is of my invention and forms the subject-matter of an application for Letters Patent of even date herewith, Serial No. 615,188; but the web-feeding mechanism herein shown and described is not restricted to use with a reel of this type or to use with any particular type of reel.

The outgoing portion of the film passes from the center of the reel 25, as shown in Fig. 4, under a guide-pulley 26, over a guide-pulley 27, and then to the main feeding mechanism, passing over the pulley 14, the idler guide-pulley 13, over pulley 28, and between that pulley and the belt 11, and thence over the stud 29 into and through the hinged guide 30, which holds the film against lateral movement while passing through the field of the projecting apparatus and also retards the film sufficiently by friction to hold it stationary during the intervals when the hereinafter-described auxiliary feeding mechanism is not feeding it forward, thence between pulleys 33 and 34 of the auxiliary intermittently-acting feeding mechanism, and thence by a loop through the guide 43, around the pulleys 20 and 22 of the take-up mechanism, passing between the belt 11 and the surface of the pulley 20, and thence about the guide-pulley 44, and back to reel 25. In passing over the pulley 28 and again in passing over the pulley 20 the film is pressed closely against the belt 11, so as to be driven or fed forward positively thereby.

The illuminating apparatus is designed to be placed upon the shelf 32, the light passing through apertures in the hinged guide 30 and through the barrel 31 and lens of the projecting apparatus.

Pulleys 12 and 23 are idler-pulleys, pulley 12 being so placed as to increase the surface of contact of the belt 11 with pulley 10, and pulley 23 being so placed as to keep the belt away from the illuminating apparatus on the shelf 32.

The main feeding mechanism and the take-up mechanism operate continuously. The auxiliary feeding mechanism, however, operates intermittently. It consists of two pulleys 33 and 34, driven at uniform peripheral speed by a belt 36, which passes over these pulleys and over a belt-tightener 37, adjustable by means of a bolt 38. This belt 36 is out of the line of the film, as shown in Fig. 2. The pulley 33 preferably has an adhesive surface formed by covering it with some substance like felt. Pulley 34, which may be termed the "gripping-pulley," has a portion of its surface of a diameter sufficient to press the film tightly against the pulley 33, while the remainder of the surface of the pulley is of less diameter, so as to leave the film free. In the drawings the portion of the pulley 34 which is of greater diameter amounts to about one-third of the circumference of the pulley; but this portion of the surface of the pulley which is of greater diameter may be more or less, according as it is desired that the film shall be stationary in the field of the projecting apparatus for a less or greater period. When the portion of the gripping-pulley 34 of greater diameter is adjacent to the pulley 33, the film is pressed tightly against the pulley 33 and is fed forward by these two pulleys; but when the smaller portion of the pulley 34 is adjacent to the pulley 33 then the film is free and is held stationary in the guide 30 by friction. The pulleys 33 and 34 revolve at a very much greater peripheral speed than the speed of the belt 11.

Pulley 34 is the driving element of the auxiliary feeding mechanism, being mounted upon the main driving-shaft 2', as shown in Fig. 5.

The mode of operation of my invention is as follows: The film 24 is in the shape of an endless web, the greater portion of which is carried by the reel 25. To introduce the same into or remove it from the machine, the driving-belt 11 is loosened by turning up the pulley 14 or letting down the pulley 20, so as to throw the driving-belt into the position shown in dotted lines, the guide 30 being opened, as shown in Fig. 3. When the web has been threaded into the position shown in Fig. 1, motion is given to the driving-belt by rotating the main driving-shaft 2 through the power-belt 3. This rotates the worm-shaft 6 and the pulley 10, which gives motion to the driving-belt 11. This speed can be varied by turning the crank-shaft 39 to right or left, which carries the friction-wheel 5 nearer to or farther from the center of the friction-disk 4, through the action of the pinion 40 and rack 41. The driving-belt, in coöperation with the pulleys 28 and 14, imparts this motion to the web 24. The pulleys 33 and 34 act as intermittent feed, tending to jerk the web 24 through the guide 30 of the projecting apparatus at regular intervals. They tend to pull the web along at each operation by an amount equal to the length of the full-faced portion 35 of the pulley 34. This amount is equal to or slightly in excess of the greatest amount of feed which the variable-feed apparatus above described can give in the interval of time of one revolution of the pulley 34. The pulley 33 has its face felted, as already stated, so that the two pulleys will have only a yielding grip on the film and can slip over it after it has been pulled taut and the slight excess of motion above described is taking place. To permit this action, a certain amount of slack must exist in the web 24 between the intermittent-feed apparatus and the take-up apparatus, which operates continuously. This is indicated in the lower portion of both figures of the drawings. The web then passes through the guide 43 and around the pulleys 20 and 22 in contact with another portion of the driving-belt 11. It then passes around the pulley 44 back to the reel.

It is evident that the variable-feed mechanism and the take-up mechanism must operate at exactly the same speed under all conditions. It is practically impossible to obtain this with any ordinary form of gearing; but it is secured in a simple manner by my invention by reason of the fact that in both of these two mechanisms the film is fed by contact with what are simply different portions of the same driving-belt 11, which of course must travel at the same speed throughout. It is evident also that the intermittent feed given the web of film must exactly equal the distance between the centers of successive pictures on the film. Otherwise the pictures will gradually creep out of registry one way or the other and instead of throwing the whole of each picture on the film portions of two successive pictures will be thrown on the screen and the illusion destroyed. It is impossible to predetermine this distance with exactness, and it varies in different films, in the same film at different times, and even in different portions of the same film at any one time, by reason of the uneven expansion and contraction of the film in drying and under differing atmospheric conditions. I secure this accuracy of registry by making the intermittent feed of the cut-away pulley 34 slightly in excess of the greatest distance between centers of adjacent pictures, so that each time the pulleys 33 and 34 feed the film they draw it taut and then slip slightly over its surface and placing the speed of the delivery or main feeding mechanism under exact control of the operator, who has his hand upon the crank-shaft 39. If he sees that the pictures are creeping off the screen in a direction which indicates that the web 24 is not traveling fast enough, he turns the crank-shaft 39 to the left, (see Fig. 1,) thereby lifting the friction-wheel 5 away from the center of the friction-disk 4 and increasing the speed of rotation of the worm-shaft 6. When a portion of the web is reached that has shrunk a little, so that a slower speed is necessary, an opposite motion of the crank-shaft 39 produces the desired result.

The effect of variation of the speed of the main feeding mechanism is to vary the amount of film fed forward during each cycle of operations of the apparatus and therefore to vary the length of the film which the auxiliary feed-rolls 33 and 44 can draw through the field of the apparatus at each operation. When the length of strip fed forward by the auxiliary feed-rolls at each operation is properly adjusted, each picture will be brought to rest in the center of the field of the apparatus.

The advantages of my invention are its simplicity, positiveness of action, simultaneousness of action in feed and take-up mechanism, quickness and convenience of removal and insertion of the web, accuracy of speed adjustment, and the gentleness with which the intermittent-feed mechanism operates on the web of film. This last point is of great importance, as the film is of delicate structure and it has been extremely difficult to jerk it through the projecting apparatus at the high rate of speed necessary without tearing or otherwise mutilating it.

Various changes could be made in the details of my apparatus without departing from the principle of my invention. Other arrangements of pulleys could be used so long as the principle of causing the variable-feed and take-up actions to result from forcing the web against separate portions of the same driving-belt is employed. Different variable-speed mechanisms could be substituted for the friction-disks and friction-wheel arrangement. More or less of the face of the pulley 34 might be cut away, and so on throughout the mere details of the apparatus, so long as the principles of operation above described are retained.

Of course it is evident that with two-thirds of the face of pulley 34 cut away the film will stand still in the projecting apparatus two-thirds of the time. During the remaining one-third of each revolution, while the full-faced portion 35 of the pulley is in operation, the film is jerked through the projecting apparatus far enough to bring the next picture in registry.

Having therefore described my invention, what I claim as new, and desire to protect by Letters Patent, is—

1. In a web-feeding mechanism, the combination, with main feeding and take-up pulleys, a single feed-belt passing around said pulleys, and means for driving the belt and pulleys, of means for passing the web between the belt and said main feeding and take-up pulleys, whereby the web is fed by friction, substantially as described.

2. In a web-feeding mechanism, the combination, with main feeding and take-up pulleys, a single feed-belt passing around said pulleys, the outer surface of said belt being in proximity to said pulleys guides for the belt, and means for driving said belt and pulleys, of means for passing the web between the belt and said main feeding and take-up pulleys, whereby the web is fed by friction, substantially as described.

3. In a web-feeding mechanism, the combination, with a feeding-pulley, a feed-belt passing around said pulley the outer surface of said belt being in proximity to said pulley, suitable guide-pulleys for the belt, and means for driving said belt and pulleys, of web-guiding devices arranged to cause the web to pass over the belt and one of the guide-pulleys, and then between said belt and the feeding-pulley, whereby the web is fed by friction, and a movable support for the pulley over which the web passes, arranged to permit said pulley to be moved out of the path of the web, thereby permitting more direct threading thereof, substantially as described.

4. In a web-employing apparatus, the combination, with the web, of main feeding and take-up mechanisms, each having a plurality of pulleys around and over which the web passes in tortuous course, and a driving-belt common to said main feeding and take-up mechanisms and likewise passing around and over the pulleys thereof in tortuous course, thereby being brought into driving contact with the web, and means for driving said belt, substantially as described.

5. In a web-feeding mechanism, the combination, with the web, a series of pulleys around and over which the web passes in tortuous course, a belt likewise passing around and over the pulleys in tortuous course, whereby it is brought into driving contact with the web, and means for driving said belt, of a movable support for one of said pulleys in the path of the web and about which both web and belt pass, said support being arranged to permit said pulley to be moved out of the path of the web and in the direction of pull of the belt, thereby slackening the belt and permitting more direct threading of the web, substantially as described.

6. In a consecutive-view apparatus, the combination, with a flexible view-carrying strip, main feeding and take-up mechanisms for feeding the strip to and taking it from the field of the apparatus, each having pulleys around and over which the strip passes in tortuous course, a single driving-belt for said main feeding and take-up mechanisms, likewise passing in tortuous course around and over said pulleys, whereby it is brought into driving contact with the strip, and means for driving said belt, of movable supports for the pulleys of said mechanisms in the path of the strip and about which said strip passes, arranged to permit said pulleys to be moved out of the path of the strip and in the direction of pull of the belt, thereby slackening the belt and permitting direct threading of the strip, substantially as described.

7. In a consecutive-view apparatus, the combination, with a flexible view-carrying strip, main feeding and take-up mechanisms for feeding the strip to and taking it from the field of the apparatus, each having pulleys around and over which the strip passes in tortuous course, a single driving-belt for said main feeding and take-up mechanisms, likewise passing in tortuous course around and over said pulleys, whereby it is brought into driving contact with the strip, and means for driving said belt, of an auxiliary intermittently-acting feeding mechanism for feeding the strip through the field of the apparatus, substantially as described.

8. The combination in a web-employing apparatus, of a main feeding mechanism, an intermittently-acting auxiliary frictional feeding mechanism, which runs at a constant speed, and means for changing the speed of the main feeding mechanism with respect to the speed of the auxiliary feeding mechanism, substantially as described.

9. In a consecutive-view apparatus, the combination, with a picture-carrying strip, and a continuously-acting main feeding mechanism for feeding the strip to the field of the apparatus, of an intermittently-acting auxiliary frictional feeding mechanism for feeding the strip through the field of the apparatus, which operates at a constant speed, and tends to feed the strip faster than the main feeding mechanism, and means for varying the speed of the main feeding mechanism with respect to the speed of the auxiliary feeding mechanism, substantially as described.

10. In a consecutive-view apparatus, the combination, with continuously-acting main feeding and take-up mechanism for feeding a flexible strip to and taking it from the field of view, comprising feeding-pulleys, a single feed-belt passing around said pulleys, means for passing the strip between the belt and feeding-pulleys, whereby the strip is fed forward and taken up by friction, and means for driving the belt and pulleys, of an intermittently-acting auxiliary feeding mechanism for feeding said strip intermittently through said field, comprising two coacting and continuously-revolving rollers between which the strip passes, and which press against the strip, one of the rollers having a portion of its face cut away so as to have the strip free during a portion of the revolution of said roller, substantially as described.

In testimony whereof I affix my signature in presence of two witnesses.

HERMAN CASLER.

Witnesses:
  GEO. B. RUSSELL,
  GRACE ROSE.